(12) United States Patent
Metral (10) Patent No.: US 10,490,012 B2
(45) Date of Patent: *Nov. 26, 2019

(54) SIMULATING I/O USING MULTICOMPUTER DATA PROCESSING

(71) Applicant: PayPal, Inc., San Jose, CA (US)

(72) Inventor: Max Edward Metral, Brookline, MA (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/676,602

(22) Filed: Aug. 14, 2017

(65) Prior Publication Data
US 2018/0276935 A1    Sep. 27, 2018

Related U.S. Application Data

(63) Continuation of application No. 15/155,464, filed on May 16, 2016, now Pat. No. 9,734,652.

(51) Int. Cl.
| | | |
|---|---|---|
| *G07F 7/08* | (2006.01) | |
| *G06K 7/08* | (2006.01) | |
| *G06K 19/07* | (2006.01) | |
| *G06Q 20/34* | (2012.01) | |

(52) U.S. Cl.
CPC ............... *G07F 7/08* (2013.01); *G06K 7/087* (2013.01); *G06K 19/07* (2013.01); *G06Q 20/341* (2013.01)

(58) Field of Classification Search
CPC ...... G06K 19/07; G06K 7/087; G06Q 20/341; G07F 7/08
See application file for complete search history.

(56) References Cited

U.S. PATENT DOCUMENTS

| | | | |
|---|---|---|---|
| 8,108,317 B2 | 1/2012 | Siegler | |
| 8,407,097 B2 | 3/2013 | Sperduti et al. | |
| 8,918,855 B2 | 12/2014 | Singh et al. | |
| 9,734,652 B1 * | 8/2017 | Metral | ................... G06K 7/087 |
| 2016/0162883 A1 | 6/2016 | Liscia et al. | |
| 2016/0335531 A1 | 11/2016 | Mullen et al. | |

* cited by examiner

*Primary Examiner* — Seung H Lee
(74) *Attorney, Agent, or Firm* — Haynes and Boone, LLP (57) ABSTRACT

Methods, systems, and computer program products are included for simulating I/O. An exemplary method includes simulating I/O from a card that includes a magnetic stripe. The method includes receiving, at a first controller, a first token from a first terminal. The first token is communicated from the first controller to at least one backend computing device. The first controller receives, from the at least one backend computing device, a second token generated at the at least one backend computing device. The first controller injects the second token into a second controller. The second controller communicates the second token to the at least one backend system.

20 Claims, 4 Drawing Sheets

SIMULATING I/O USING MULTICOMPUTER DATA PROCESSING

PRIORITY

The present application is a continuation of U.S. patent application Ser. No. 15/155,464, filed May 16, 2016, issued as U.S. Pat. No. 9,734,652, entitled "SIMULATING I/O USING MULTICOMPUTER DATA PROCESSING," which is herein incorporated by reference in its entirety.

BACKGROUND

Field of the Invention

The present disclosure generally relates to electrical computers and digital data processing systems.

Related Art

Conventional input/output (I/O) devices include devices such as magnetic stripe cards, smart/chip cards, smart phones, keyboards, magnetic stripe readers, and chip readers. Traditionally, a magnetic stripe reader reads data from a magnetic stripe card when a user swipes the magnetic stripe along a magnetic reading head of the magnetic stripe reader. The swiping of the card causes a change in a magnetic field that enables data to be read from the magnetic stripe by the magnetic stripe reader.

Another conventional I/O device is a smart card, or a chip card, which typically includes a card that has an embedded microchip, such as an EMV smart chip. Traditionally, the microchip of the smart card is dipped into a chip reader or tapped against a chip reader to transmit data to a chip reader. The chip reader reads data from the microchip either through physical contact with the microchip or via a wireless technology, such as an electromagnetic field communication.

Other conventional I/O devices include smart phones and other portable electronics that may communicate using technologies such as Bluetooth, near-field communication (NFC), and/or other wired and wireless technologies.

BRIEF DESCRIPTION OF THE DRAWINGS

The present invention is illustrated by way of example and not limitation in the figures of the accompanying drawings.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Various examples described herein provide a computing device that receives an input of a token from a device, such as a smart card or a mobile phone. The smart card or mobile phone may generate the token to perform a transaction. The computing device transmits the token to a backend processing system that generates a second token in a format that would be provided by a magnetic stripe card. At least a portion of the second token includes an identifier that corresponds to the backend processing system. The second token is returned to the computing device. The computing device simulates an input of the second token by injecting the token into a magnetic stripe reader component or a software program running on the computing device (or another computing device). The injecting of the second token simulates an input of the second token from a magnetic stripe card. The computing device then processes a transaction using the second token. The transaction includes identifying the backend processing system, using the identifier included in the second token, and routing the second token to the backend processing system.

These techniques are beneficial and advantageous for enabling a computing device to convert an input from a chip card or a mobile phone into a magnetic stripe input. These techniques are useful in a variety of contexts. For example, in the context of transaction processing, legacy systems may be configured to process transactions using an input from swiping a magnetic stripe or reading a number from a magnetic stripe card. These legacy systems may not be compatible with technologies such as chip cards and near-field communication. Accordingly, the techniques for simulating a magnetic stripe input are useful for conversion of I/O (e.g., input, output, or a combination thereof) from a chip or other format type to a magnetic stripe card I/O type, such that a transaction may then be performed using the magnetic stripe card I/O type. These techniques improve interoperability of a computing device with smart card and portable electronic technologies, such that the functioning of the computing device is improved. These techniques address particular problems associated with legacy computing devices and offer solutions that improve the operation of the computing devices. For example, these techniques allow computing devices to process I/O, such as in the context of transaction processing, that would otherwise be inaccessible to the computing devices. Of course, it is understood that these features and advantages are shared among the various examples herein and that no one feature or advantage is required for any particular embodiment.

Figure 1:
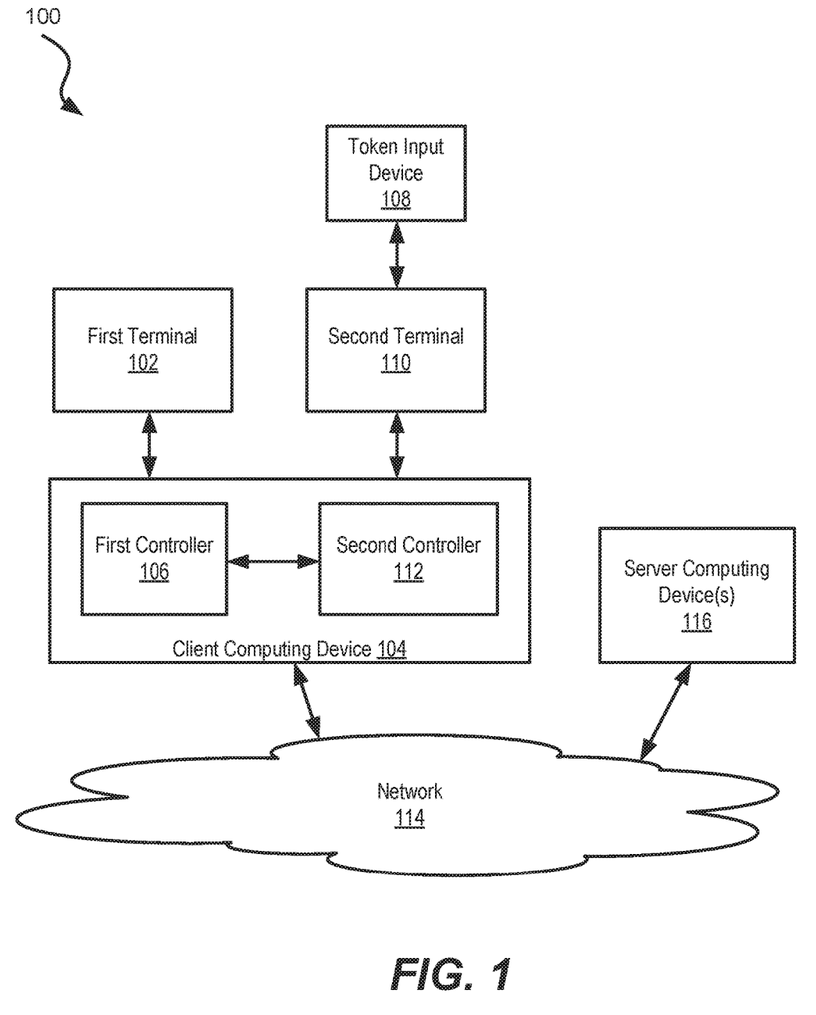
FIG. 1 is a block diagram illustrating a multicomputer system architecture for performing data processing, in accordance with various examples of the present disclosure.

FIG. 1 illustrates a multicomputer system architecture 100 for performing data processing, in accordance with various examples of the present disclosure.

System architecture 100 includes a first terminal 102 that is structured as a computing device. In some examples, the first terminal 102 is structured to include a magnetic stripe reader that is configured to read data from magnetic stripe cards when the magnetic stripe cards are swiped at the magnetic stripe reader. In other examples, the first terminal 102 is structured as a keyboard, keypad, and/or other key input device that is structured to accept key press input to accept data that is read from a magnetic stripe card by a user.

For example, a magnetic stripe card may include an identifier such as a primary account number (PAN), that may be visually read from the card by a user and typed into the first terminal 102 via a plurality of key presses.

The first terminal 102 is communicatively coupled to a client computing device 104. In some examples, the first terminal 102 is communicatively coupled to the client computing device 104 via a wired connection (e.g., a USB cable) or a wireless connection (e.g., Bluetooth).

In the present example, the client computing device 104 is structured as a desktop computer, or other computing device, that includes a first controller 106. The first controller 106 may be structured as, for example, a computer program comprising one or more instructions that are executable to provide an interface to a user. The first controller 106 may control the first terminal 102 to perform I/O functions or operations.

In some examples, the client computing device 104 is located at a merchant point of sale (POS). In this example, the first controller 106 may include software, hardware, or a combination thereof that provides a purchasing interface for inputting sales and calculating an amount due from a customer. In this example, the first controller 106 is structured to communicate with the first terminal 102 to request that the first terminal 102 perform a magnetic stripe I/O operation. For example, the first controller 106 may activate the first terminal 102 such that a customer may swipe a card that includes a magnetic stripe. The first terminal 102 may then read the data from the magnetic stripe, such as a PAN, and communicate this data to the first controller 106. In other examples, these techniques are performed in other contexts such as authentication, ticketing, user identification, and so forth.

The system architecture 100 includes a token input device 108. In some examples, the token input device 108 is structured as a smart card/chip card. In other examples, the token input device 108 is structured as a wireless and/or NFC-enabled device, such as a smart phone. The token input device 108 is structured to generate a first token and communicate the first token to the second terminal 110. Accordingly, in some examples the second terminal 110 is structured as a chip reader that reads the first token from the token input device 108 by communicating with a microprocessor embedded on the smart card. In other examples, the second terminal 110 is structured as a smart phone or other electronic device that reads the first token from the token input device 108 via an NFC or other wireless protocol. For example, if the token input device 108 is structured as a smart phone or smart card, the token input device 108 may be tapped or otherwise moved within a threshold proximity to the second terminal 108 to allow the second terminal 108 to read the first token.

Figure 2:
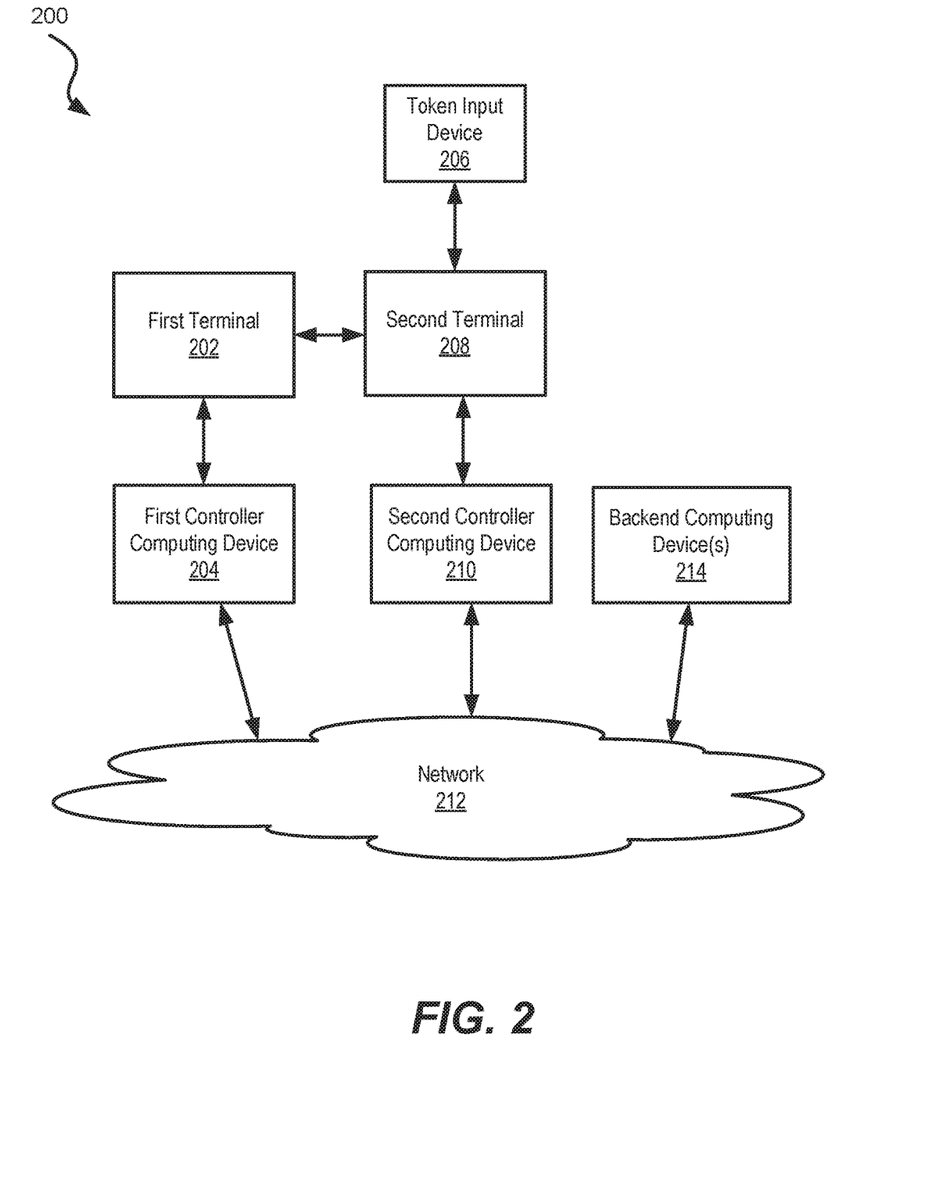
FIG. 2 is a block diagram illustrating a multicomputer system architecture for performing data processing, in accordance with various examples of the present disclosure.

In the present example, the client computing device 104 is structured to include a second controller 112. While in the present example the first controller 106 and second controller 112 are shown as being structured on a client computing device 104, in other examples the first controller 106 and second controller 112 may be structured on a plurality of computing devices. For example, as shown in FIG. 2, the first controller may be structured on a first computing device and the second controller may be structured on a second computing device.

In some examples, the second controller 112 is structured as hardware and/or software, such as a computer program comprising one or more instructions that are executable to provide an interface that controls the second terminal 110 to perform I/O. As described above, the client computing device 104 may be located at a POS. The second controller 112 may provide an interface for inputting an amount due and/or triggering the second terminal 110 to perform I/O functions or operations. In this example, the second controller 112 is structured to communicate to the second terminal 110 a request that the second terminal 110 read data from the token input device 108. For example, the second controller 112 may configure and/or activate the second terminal 110 such that a customer may input a first token from the token input device 108 by inserting a chip card or positioning a smart phone within a threshold proximity of the second terminal 110. The second terminal 110 is structured to read the first token from the smart card and/or smart phone and communicate the first token to the second controller 112.

The client computing device 104 is communicatively coupled to a network 114. The network 114 may be structured to include a private network, such as an intranet, and/or public network, such as the internet. The client computing device 104 is structured to transmit data to and from the network 114 to communicate with other computing devices, such as one or more server computing devices 116.

In the present example, the one or more server computing devices 116 are structured receive and process data received from the client computing device 104 to perform one or more transactions. For example, once the first controller 106 receives magnetic stripe data from the first terminal 102, the first controller 106 may communicate the magnetic stripe data to the network 114 via a network card or other network device of the client computing device 104. Similarly, when the second controller 112 receives the first token from the second terminal 110, the second controller 112 may communicate the first token to the network 114 via a network card or other network device of the client computing device 104. The network 114 communicates the magnetic stripe data or first token to the one or more server computing devices 116 for processing. In some examples, the processing includes performing a transaction such as transferring funds between a customer account and a merchant account. After performing the transaction, the one or more server computing devices 116 may notify the first controller 106 or the second controller 112 that the transaction has been processed.

In the present example, the second terminal 110, second controller 112, and/or one or more server computing devices 116 are structured to simulate magnetic stripe I/O by generating magnetic stripe data and injecting the magnetic stripe data into the first controller 106. For example, this data processing may be performed as described in detail with respect to FIG. 4. In some examples, the system architecture 100 is structured to inject magnetic stripe data after the one or more server computing devices 116 receive the first token from the client computing device 104. For example, the one or more server computing devices 116 may generate a second token that represents a PAN or other data that would be read from a magnetic stripe. This second token may be structured to include one or more digits that are uniquely identifiable as associated with the one or more server computing devices 116. The one or more server computing devices 116 are then structured to communicate the second token to the second controller 112 at the client computing device 104.

In some examples, the second controller 112 is structured to inject the second token into the first controller 106 by simulating key inputs to type the PAN or other magnetic stripe data into an interface provided by the first controller 106. For example, the client computing device 104 may be structured with an operating system that includes an application programming interface (API) that may be called to send key inputs from a keyboard or keypad. In this example, the second controller 112 is structured to call the API to inject the second token into the first controller 106 via simulated key inputs.

The first controller 106 is structured to perform transaction processing using the second token. In some examples, the first controller 106 is structured to transmit the second token to the one or more server computing devices 116 to complete the transaction processing. In the present example, the second token is routed to the one or more server computing devices 116 by the client computing device 104 and/or other transaction processing systems located on the network 114 based on recognizing that the second token is associated with the one or more server computing devices 116. As previously discussed, the second token may include an identifier that associates the second token with the one or more server computing devices 116. Accordingly, the one or more server computing devices 116 receives the second token as part a of a transaction processing operation, and may be structured to perform one or more operations, such as transferring funds, sending notifications to the client computing device 104, and so forth.

FIG. 2 illustrates a multicomputer system architecture 200 for performing data processing, in accordance with various examples of the present disclosure.

System architecture 200 includes a first terminal 202 that is structured as a computing device. In some examples, the first terminal 202 is structured to include a magnetic stripe reader that is configured to read data from magnetic stripe cards when the magnetic stripe cards are swiped at the magnetic stripe reader. In other examples, the first terminal 202 is structured as a keyboard, keypad, and/or other key input device that is structured to accept key press input to accept data that is read from a magnetic stripe card by a user. For example, a magnetic stripe card may include an identifier such as a PAN, that may be visually read from the card by a user and typed into the first terminal 102 via a plurality of key presses.

The first terminal 202 is communicatively coupled to a first controller computing device 204. In some examples, the first terminal 202 is communicatively coupled to the first controller computing device 204 via a wired connection (e.g., a USB cable) or a wireless connection (e.g., Bluetooth).

In the present example, the first controller computing device 204 is structured as a desktop computer, smart phone, or other computing device. The first controller computing device 204 may be structured to include a computer program comprising one or more instructions that are executable to provide an interface to a user. The first controller computing device 204 may control the first terminal 202 to perform I/O functions or operations. For example, the first controller computing device 204 may be located at a POS. In this example, the first controller computing device 204 may include software, hardware, or a combination thereof that provides a purchasing interface for inputting sales and calculating an amount due from a customer. In this example, the first controller computing device 204 is structured to communicate with the first terminal 202 to request that the first terminal 202 perform a magnetic stripe I/O operation. For example, the first controller computing device 204 may activate the first terminal 202 such that a customer may swipe a card that includes a magnetic stripe. The first terminal 202 may then read the data from the magnetic stripe, such as a PAN, and communicate this data to the first controller computing device 204. In other examples, these techniques are performed in other contexts such as authentication, ticketing, user identification, and so forth.

The system architecture 200 includes a token input device 206. In some examples, the token input device 206 is structured as a smart card/chip card. In other examples, the token input device 206 is structured as a wireless and/or NFC-enabled device, such as a smart phone. The token input device 206 is structured to generate a first token and communicate the first token to a second terminal 208. Accordingly, in some examples the second terminal 208 is structured as a chip reader that reads the first token from the token input device 206 by communicating with a microprocessor embedded on the smart card. In other examples, the second terminal 208 is structured as a smart phone or other electronic device that reads the first token from the token input device 206 via an NFC or other wireless protocol. For example, if the token input device 206 is structured as a smart phone or a smart card, the token input device 206 may be tapped or otherwise moved within a threshold proximity to the second terminal 206 to allow the second terminal 208 to read the first token.

The second terminal 208 is structured to communicate the first token to the second controller computing device 210, which receives the first token. In some examples, the second controller computing device 210 is structured as hardware and/or software, such as a computer program comprising one or more instructions that are executable to provide an interface that controls the second terminal 208 to perform I/O functions or operations. While in the present example the first controller computing device 204 and second controller computing device 210 are shown as being structured as separate computing devices, in other examples the first controller computing device 204 and second controller computing device 210 may be structured on a same computing device. For example, as shown in FIG. 1, a first controller and a second controller may be structured on a client computing device. As described above with respect to the first controller computing device 204, the second controller computing device 210 may also be located at a POS.

The second controller computing device 210 may provide an interface for inputting an amount due and/or triggering the second terminal 208 to perform I/O functions or operations. In this example, the second controller computing device 210 is structured to communicate to the second terminal 208 a request that the second terminal 208 read data from the token input device 206. For example, the second controller computing device 210 may configure and/or activate the second terminal 208 such that a customer may input a first token from the token input device 206 by inserting a chip card or positioning a smart phone within a threshold proximity of the second terminal 208. The second terminal 208 is structured to read the first token from the smart card and/or smart phone and communicate the first token to the second controller computing device 210.

The second controller computing device 210 is communicatively coupled to a network 212. The network 212 may be structured to include a private network, such as an intranet, and/or public network, such as the internet. The second controller computing device 210 is structured to transmit data to and from the network 212 to communicate with other computing devices, such as one or more backend computing devices 214.

In the present example, the one or more backend computing devices 214 are structured to receive and process data received from the second controller computing device 210 to perform one or more transactions. For example, once the first controller computing device 204 receives magnetic stripe data from the first terminal 202, the first controller computing device 204 may communicate the magnetic stripe data to the network 212 via a network card or other network device of the first controller computing device 204. Similarly, when the second controller computing device 210 receives the first token from the second terminal 208, the second controller computing device 210 may communicate the first token to the network 212 via a network card or other network device of the second controller computing device 210. The network 212 communicates the magnetic stripe data or first token to the one or more backend computing devices 214 for processing. In some examples, the processing includes performing a transaction such as transferring funds between a customer account and a merchant account. After performing the transaction, the one or more backend computing devices 214 may notify the first controller computing device 204 or the second controller computing device 210 that the transaction has been processed.

In the present example, the second terminal 208, second controller computing device 210, and/or one or more backend computing devices 214 are structured to simulate magnetic stripe I/O by generating magnetic stripe data and injecting the magnetic stripe data into the first terminal 202 and/or first controller computing device 204. For example, this data processing may be performed as described in detail with respect to FIG. 4. In some examples, the system architecture 200 is structured to inject magnetic stripe data after the one or more backend computing devices 214 receive the first token from second controller computing device 210. For example, the one or more backend computing devices 214 may generate a second token that represents a PAN or other data that would be read from a magnetic stripe. This second token may be structured to include one or more digits that are uniquely identifiable as associated with the one or more backend computing devices 214. The one or more backend computing devices 214 are then structured to communicate the second token to the second controller computing device 210.

The second controller computing device 210 is structured to inject the PAN or other magnetic stripe data by communicating the second token to the second terminal 208. In this example, the second terminal 208 is structured to generate a magnetic signal to simulate a magnetic swipe operation. The second terminal 208 communicates the second token to the first terminal 202 via the magnetic signal. Accordingly, the first terminal 202 is structured to receive the second token via the magnetic signal and communicate the second token to the first controller computing device 204 to complete a transaction using the second token, as though the data was received from swiping a card having a magnetic stripe storing the second token.

The first controller computing device 204 is structured to perform transaction processing using the second token. In some examples, the first controller computing device 204 is structured to transmit the second token to the one or more backend computing devices 214 to complete the transaction processing. In the present example, the second token is routed to the one or more backend computing devices 214 by first controller computing device 204 and/or other transaction processing systems located on the network 212 based on recognizing that the second token is associated with the one or more backing computing devices 214. As previously discussed, the second token may include an identifier that associates the second token with the one or more backend computing devices 214. Accordingly, the one or more backend computing devices 214 receive the second token as part of a transaction processing operation, and may be structured to perform one or more operations, such as transferring funds, sending notifications to the first controller computing device 204, and so forth.

Figure 3:
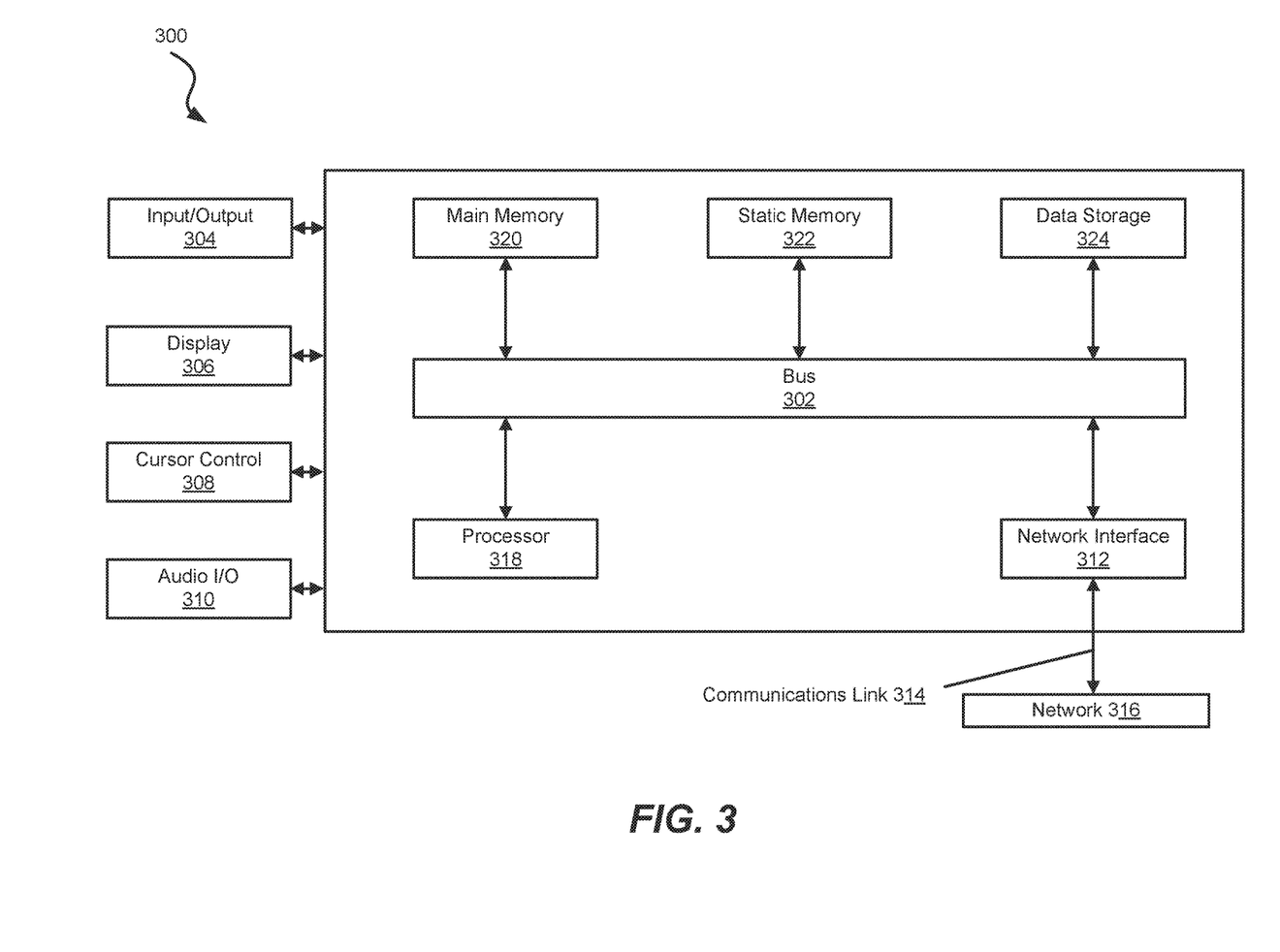
FIG. 3 is a block diagram illustrating a computer system suitable for implementing one or more computing devices.

FIG. 3 illustrates a computer system 300 suitable for implementing one or more computing devices. In various implementations, computer system 300 may structure a computing device as a mobile phone, a computing tablet, a desktop computer, laptop, wearable device, rack mount server, or any machine capable of executing a set of instructions (sequential or otherwise) that specify actions to be taken by that machine.

Computer system 300 may include a bus 302 or other communication mechanisms for communicating information data, signals, and information between various components of computer system 300. Components include an I/O component 304 that processes a user action, such as selecting keys from a keypad/keyboard, selecting one or more buttons, links, actuatable elements, swiping a card via a magnetic stripe reader, tapping an NFC device, inputting a chip via a chip reader, etc., and sends a corresponding signal to bus 302. I/O component 304 may also include an output component, such as a display 306 and a cursor control 308 (such as a keyboard, keypad, mouse, touch screen, etc.). An optional audio I/O component 310 may also be included to allow a user to hear audio and/or use voice for inputting information by converting audio signals.

A network interface 312 transmits and receives signals between computer system 300 and other devices, such as user devices, data servers, and/or other computing devices via a communications link 314 and a network 316 (e.g., such as a LAN, WLAN, PTSN, and/or various other wired or wireless networks, including telecommunications, mobile, and cellular phone networks).

The processor 318 represents one or more general-purpose processing devices such as a microprocessor, central processing unit, or the like. More particularly, processor 318 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 318 may also be one or more special-purpose processing devices such as an application specific integrated circuit (ASIC), a field programmable gate array (FPGA), a digital signal processor (DSP), network processor, or the like. Processor 318 is configured to execute instructions for performing the operations and steps discussed herein.

Components of computer system 300 also include a main memory 320 (e.g., read-only memory (ROM), flash memory, dynamic random access memory (DRAM) such as synchronous DRAM (SDRAM), double data rate (DDR SDRAM), or DRAM (RDRAM), and so forth), a static memory 322 (e.g., flash memory, static random access memory (SRAM), and so forth), and a data storage device 324 (e.g., a disk drive).

Computer system 300 performs specific operations by processor 318 and other components by executing one or more sequences of instructions contained in main memory 320. Logic may be encoded in a computer readable medium, which may refer to any medium that participates in providing instructions to processor 318 for execution. Such a medium may take many forms, including but not limited to, non-volatile media, volatile media, and/or transmission media. In various implementations, non-volatile media includes optical or magnetic disks, volatile media includes dynamic memory, such as main memory 320, and transmission media between the components includes coaxial cables, copper wire, and fiber optics, including wires that comprise bus 302. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium. CD-ROM, any other optical medium, punch cards, paper tape, any other physical medium with patterns of holes. RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 300. In various other embodiments of the present disclosure, a plurality of computer systems 300 coupled by communication link 314 to the network 316 may perform instruction sequences to practice the present disclosure in coordination with one another. Modules described herein may be embodied in one or more computer readable media or be in communication with one or more processors to execute or process the steps described herein.

Figure 4:
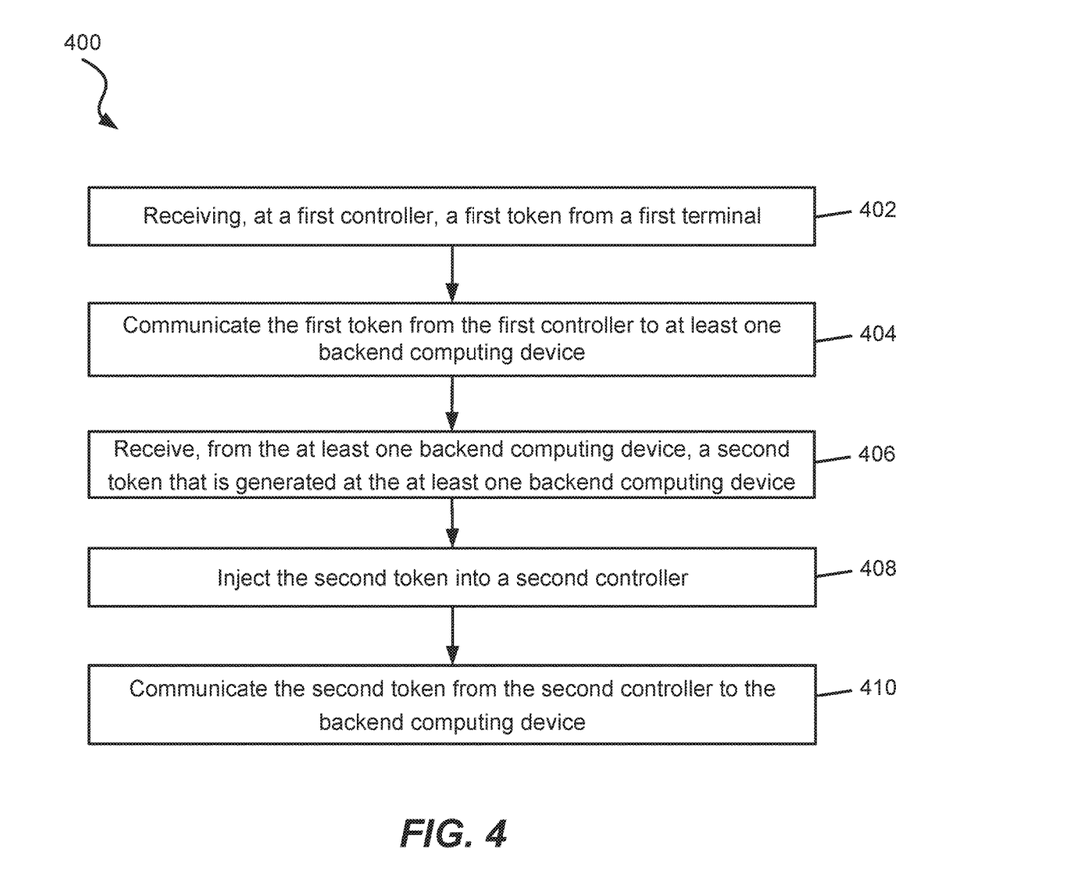
FIG. 4 is a flow diagram illustrating a method for processing a transaction, in accordance with various examples of the present disclosure.

FIG. 4 illustrates a method for processing a transaction, in accordance with various examples of the present disclosure. In some examples, the method 400 is implemented by one or more processors executing computer-readable instructions to perform the functions described herein. It is understood that additional steps can be provided before, during, and after the steps of method 400, and that some of the steps described can be replaced or eliminated in other examples of the method 400.

At action 402, a first controller receives a first token from a first terminal. In the present example, the first terminal reads the first token from a token input device, such as a smart card or smart phone. In some examples, the token is read from an EMV-compliant chip card or EMV-compliant mobile phone using an industry standard while conducting a financial transaction, such as a payment operation. The first terminal communicates the first token to the first controller via a wired and/or wireless communication medium. In some examples, the first controller requests that the first terminal input the first token responsive to a transaction being performed on the first controller. For example, the first controller may request input of the first token corresponding to a purchase of a service or good at a POS of a merchant. A price corresponding to the purchase may be input into the first controller, which may then trigger the first terminal to receive the first token from the token input device. In other examples, inserting a smart card into the first terminal, placing an NFC-capable device within a threshold proximity of the first terminal, or a user-input at the first terminal may trigger the first terminal to read the first token and communicate the token to the first controller. Accordingly, the first token is input at the first terminal and communicated to the first controller from the first terminal. The first controller receives the first token from the first terminal.

In some examples, the first token includes a ciphertext that is a numeric or alphanumeric string that represents a private key and/or primary account number (PAN) encrypted by the token input device. For example, the token input device may generate the first token for performing a transaction by encrypting a private key, such as a PAN, that is associated with the token input device or a user of the token input device. The first token may also be associated with a time, such that the first token may be invalid/expire after a threshold period of time.

At action 404, the first controller communicates the first token via a network to a backend computing device, such as a transaction processing server or other server. In some examples, the backend computing device comprises a plurality of computing devices. In other examples, the backend computing device receives the first token via the network by way of one or more other backend computing devices, such as transaction processing servers corresponding to a merchant.

At action 406, the backend computing device processes a transaction using the first token. In some examples, the backend computing device determines the private key, such as a PAN, corresponding to the first token by decrypting the first token. The backend computing device performs the transaction using the private key, such as by processing a payment corresponding to the PAN. For example, the backend computing device may process a transaction by transferring funds to a merchant from a customer account corresponding to the PAN. The backend computing device generates a second token as part of the transaction processing and communicates the second token to the first controller. In some examples, the second token is generated and communicated to the first controller after the transaction has been processed to transfer funds to the merchant.

In the present example, the second token that is generated by the backend computing device includes at least one digit that is associated with the backend computing device. For example, the second token may include a four to six digit portion that represents a unique identifier that is assigned to the backend computing device. These digits may be identifiable on other computing devices, such that the other computing devices recognize that the second token is associated with the backend computing device and route transactions to the backend device based on said recognition.

At action 408, the first controller receives the second token from the backend computing device. After receiving the second token, the first controller and/or peripheral device, such as the first terminal, injects the second token into a second controller. The injecting of the second token into the second controller is performed to simulate I/O from a magnetic stripe or keyboard/keypad.

In some examples, the first controller injects the second token into the second controller by simulating a typing of the second token via a series of key presses. For example, the first controller may call a send key API of the second controller's computing device to input the second token into the second controller via simulated key press inputs.

In other examples, the first controller injects the second token into the second controller by causing the first terminal or another peripheral device to generate a magnetic signal that simulates swiping a magnetic stripe that stores the second token. A second terminal that is structured as a magnetic stripe card reader may read the magnetic signal to receive the second token. The second terminal may then input the second token into the second controller. Accordingly, magnetic stripe I/O is simulated by the first controller and/or first terminal to inject the second token into the second controller.

At action 410, the second controller processes the second token by communicating the second token to the backend processing system. For example, the second controller may process the second token as though the second token is a PAN corresponding to a credit/debit card of a customer. Accordingly, the second controller may process a payment to the merchant using the PAN. In some examples, the second controller matches the one or more digits of the second token that are uniquely identifiable to the backend computing device to route the transaction to the backend computing device. In other examples, the second controller processes the second token by communicating the second token to a payment processor corresponding to the merchant, and the payment processor matches the one or more digits of the second token to route the second token to the backend computing device.

The backend computing device receives the second token and recognizes the second token as generated corresponding to the processing performed at action 406. Accordingly, if the backend computing device already transferred funds from the customer to the merchant after receiving the first token, the backend computing device may identify that the funds have been transferred and notify the second controller that the transaction has been processed. In other examples, the backend computing device may wait to transfer the funds until the second token is received. Accordingly, upon receiving the second token, the backend computing device may transfer the funds and notify the second controller that the transaction has been processed.

It is to be understood that the above description is intended to be illustrative, and not restrictive. Many other examples will be apparent to those of skill in the art upon reading and understanding the above description. The scope of the disclosure should, therefore, be determined with reference to the appended claims, along with the full scope of equivalents to which such claims are entitled.

What is claimed is:

1. A system comprising:
a non-transitory memory; and
one or more hardware processors coupled to the non-transitory memory and configured to read instructions from the non-transitory memory to cause the system to perform operations comprising:
receiving a first token read from a token input device;
transmitting the first token over a network to at least one backend computing device;
receiving, from the at least one backend computing device, a second token that is different than the first token;
simulating input including a magnetic stripe input or a key press input; and
providing the simulated input to a transaction processing device.

2. The system of claim 1, wherein the token input device comprises a chip card or a mobile phone.

3. The system of claim 1, wherein the first token is readable by a chip reader device.

4. The system of claim 1, wherein the first token comprises a numeric or alphanumeric string that represents a private key or a primary account number.

5. The system of claim 1, wherein simulating the magnetic stripe input includes generating a magnetic signal that transmits the second token to a magnetic stripe reader corresponding to the transaction processing device.

6. The system of claim 1, wherein simulating the key press input includes calling an Application Programming Interface (API) function for one or more digits included in the second token to emulate a user entering the key press input on a keyboard or a keypad device corresponding to the transaction processing device.

7. The system of claim 1, wherein the first token is readable via a near-field communication (NFC) or by reading a microprocessor embedded in a chip card.

8. The system of claim 1, wherein the second token includes an identifier portion that is uniquely identifiable to the at least one backend computing device.

9. A non-transitory machine-readable medium having stored thereon machine-readable instructions executable to cause a machine to perform operations comprising:
receiving a first token read from a token input device;
transmitting the first token over a network to at least one backend computing device;
receiving, from the at least one backend computing device, a second token that is different than the first token;
simulating input including a magnetic stripe input or a key press input; and
providing the simulated input to a transaction processing device.

10. The non-transitory machine-readable medium of claim 9, wherein the token input device comprises a chip card or a mobile phone.

11. The non-transitory machine-readable medium of claim 9, wherein simulating the magnetic stripe input includes generating a magnetic signal that transmits the second token to a magnetic stripe reader corresponding to the transaction processing device.

12. The non-transitory machine-readable medium of claim 9, wherein simulating the key press input includes calling an Application Programming Interface (API) function for one or more digits included in the second token to emulate a user entering the key press input on a keyboard or a keypad device corresponding to the transaction processing device.

13. The non-transitory machine-readable medium of claim 9, wherein the first token is readable via a near-field communication (NFC) or by reading a microprocessor embedded in a chip card.

14. The non-transitory machine-readable medium of claim 9, wherein the second token includes an identifier portion that is uniquely identifiable to the at least one backend computing device.

15. A method comprising:
receiving a first token read from a token input device;
transmitting the first token over a network to at least one backend computing device;
receiving, from the at least one backend computing device, a second token that is different than the first token;
simulating input including a magnetic stripe input or a key press input; and
providing the simulated input to a transaction processing device.

16. The method of claim 15, wherein the token input device comprises a chip card or a mobile phone.

17. The method of claim 15, wherein simulating the magnetic stripe input includes generating a magnetic signal that transmits the second token to a magnetic stripe reader corresponding to the transaction processing device.

18. The method of claim 15, wherein simulating the key press input includes calling an Application Programming Interface (API) function for one or more digits included in the second token to emulate a user entering the key press input on a keyboard or a keypad device corresponding to the transaction processing device.

19. The method of claim 15, wherein the first token is readable via a near-field communication (NFC) or by reading a microprocessor embedded in a chip card.

20. The method of claim 15, wherein the second token includes an identifier portion that is uniquely identifiable to the at least one backend computing device.

* * * * *